United States Patent [19]

Ball

[11] Patent Number: 4,489,018
[45] Date of Patent: Dec. 18, 1984

[54] METHOD AND APPARATUS FOR SEALING A PLASTICS MATERIAL TO A METAL SUBSTRATE

[75] Inventor: Martin F. Ball, Shrivenham, England

[73] Assignee: Metal Box Limited, Reading, England

[21] Appl. No.: 511,443

[22] Filed: Jul. 6, 1983

Related U.S. Application Data

[63] Continuation of Ser. No. 240,778, Mar. 5, 1981, abandoned.

[30] Foreign Application Priority Data

Mar. 25, 1980 [GB] United Kingdom ............... 8009976

[51] Int. Cl.$^3$ ............................................... B29C 6/04
[52] U.S. Cl. ........................................ 264/25; 220/270; 220/363; 264/130; 264/264; 264/274; 425/116; 425/117; 425/127; 425/129 R; 425/174.8 R
[58] Field of Search ............... 264/25, 130, 264, 265, 264/267, 274; 425/174.8 R, 809, 116, 125, 127, 117, 129 R; 220/270, 363, 364

[56] References Cited

.U.S. PATENT DOCUMENTS

| | | | |
|---|---|---|---|
| 2,366,274 | 1/1945 | Luth et al. | 264/274 |
| 2,456,615 | 12/1948 | Berglund | 264/273 |
| 2,705,346 | 4/1955 | Schlabach et al. | 264/242 |
| 2,777,411 | 1/1957 | Geisler | 425/809 |
| 2,841,863 | 7/1958 | Geisler | 425/809 |
| 3,037,474 | 6/1962 | Navikas | 425/809 |
| 3,051,607 | 8/1962 | Werth | 264/264 |
| 3,074,117 | 1/1963 | Carpenter et al. | 264/DIG. 46 |
| 3,503,823 | 3/1970 | Richart et al. | 264/25 |
| 3,591,996 | 7/1971 | Shanok et al. | 264/274 |
| 3,778,017 | 12/1973 | Doucerain et al. | 249/78 |
| 3,966,869 | 6/1976 | Kohl | 264/267 |
| 4,016,311 | 4/1977 | Ellerbroch et al. | 264/265 |
| 4,065,539 | 12/1977 | Nadel | 264/273 |
| 4,140,451 | 2/1979 | Herdzina, Jr. et al. | 425/809 |
| 4,202,091 | 5/1980 | Ohnishi | 264/273 |
| 4,210,618 | 7/1980 | Piltz et al. | 264/264 |
| 4,230,659 | 10/1980 | Sutch | 264/130 |

FOREIGN PATENT DOCUMENTS 50-117852 9/1975 Japan ..................... 264/27

Primary Examiner—James Lowe
Attorney, Agent, or Firm—Diller, Ramik & Wight

[57] ABSTRACT

A method and apparatus associated with plastics material applied by injection moulding to a metal substrate by surrounding at least a portion of the substrate with a mould and injecting flowable plastics material into the mould, characterized in that the method and/or the apparatus utilizes locally induced heat in the portion of the metal substrate surrounded by the mould to bond and sealingly adhere the plastics material to the metal substrate in total surface-to-surface contact.

25 Claims, 10 Drawing Figures

METHOD AND APPARATUS FOR SEALING A PLASTICS MATERIAL TO A METAL SUBSTRATE

This application is a continuation of application Ser. No. 06/240,778, filed 3/5/81 now abandoned.

This invention relates to a method and apparatus for sealing a plastics material to a metal substrate and more particularly but not exclusively to a method and apparatus for injection moulding a closure member into an aperture in a can end.

In British Patent Specification No. 1,264,653 a removable closure for a beverage can is described, the can end having an aperture therein and the closure having a plug portion which extends through the aperture, an external flange on the plug portion to prevent the plug passing completely into the can and an internal flange of the plug portion to retain the closure in the aperture against the carbonation pressure of the beverage. Although the closure has a tapered shape to assist fitting of the moulded plug into the aperture the operation of fitting the plug is difficult because the nylon plugs are of necessity stiff to contain the internal pressure in a beverage can. Furthermore difficulty has been experienced in achieving an efficient seal between the nylon plug and the metal of the can end.

This invention seeks to elimate the difficulty of fitting by moulding the closure into an aperture in the metal substrate. However, when a plastics material is moulded onto a cold metal surface the plastics material tends to chill without forming an effective seal with the metal surface.

Accordingly this invention provides a method of bonding a plastics material to a metal substrate comprising the steps of enclosing at least a portion of the substrate in a mould, introducing a fluent plastics material into the mould and heating at least the portion of the substrate in the mould to delay chilling of the plastics material while a seal develops between the substrate and the plastics material.

In one embodiment of the method a metal substrate in the form of a substantially planar sheet of metal is enclosed within a mould of a shape to surround a peripheral margin of the planar sheet and heat is applied to the peripheral margin.

In another embodiment of the method a metal substrate in the form of a sheet of metal having an aperture therein is clamped between an upper and a lower die so that cavity in the upper die spans the aperture, a cavity in the lower die spans the aperture and the aperture in the sheet of metal connects said cavities to act as a mould shape, plastics material is introduced into the mould shape to mould a closure keyed in the aperture, heat being applied to at least a peripheral margin of the sheet metal around the aperture to seal the plastics material to the peripheral margin.

In a preferred method heat is applied by means of induction heating. The plastics material may be cooled by passing a coolant fluid through the mould.

A coating material to which the plastics material will adhere may be applied to the metal substrate before the plastics material is moulded thereon. A lubricated varnish, to which the plastics material will not adhere, may be applied to portions of the substrate to prevent adhesion where it would be inconvenient, such as handle portions of plug closures.

The invention provides a metal substrate bonded to a plastics material produced by the method.

The invention also provides apparatus comprising a mould having means to introduce a fluent plastics material into the mould and being of a shape to enclose at least a portion of the metal substrate and means to apply heat to the portion of the metal substrate enclosed by the mould.

In one embodiment of the apparatus the mould defines an annular cavity to enclose a peripheral margin of a metal substrate in the form of a substantially planar sheet of metal.

In another embodiment the apparatus comprises an upper die, a lower die and means to hold a sheet of metal having an aperture therein between the dies, at least one of the dies being movable to clamp the sheet of metal between the dies to define big cavities in the upper and lower dies, connected by the aperture a mould shape, said apparatus further comprising means to introduce a plastics material into the mould shape to mould a closure keyed into the aperture; and heating means to heat at least a peripheral margin of metal substrate around the aperture.

In a preferred apparatus the metal substrate is heated by an induction coil. The mould may, if desired, include a passage for a coolant fluid.

The invention further provides a metal substrate sealed to a plastics material by means of the apparatus.

Various embodiments of the invention will now be described by way of example and with reference to the accompanying drawings in which.

Figure 1:
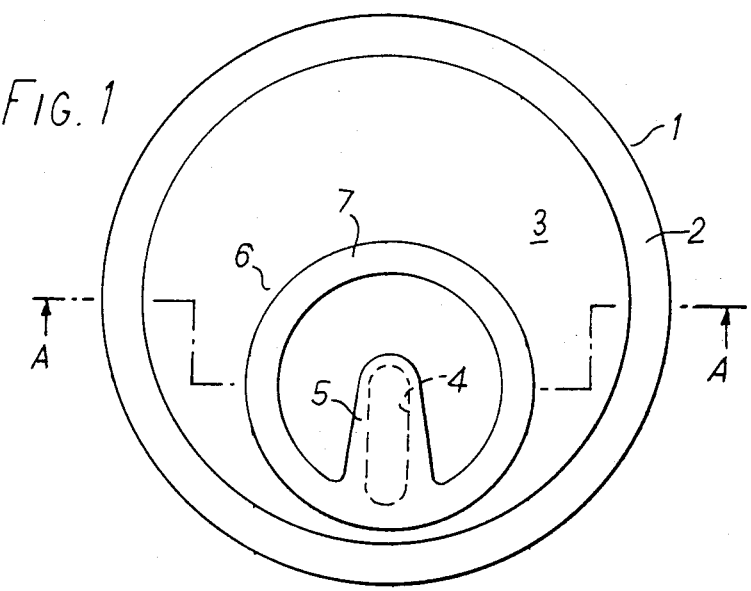
FIG. 1 is a plan view of a can end having an aperture closed by a plastics closure.

In FIG. 1 a can end 1 has a peripheral cover hook 2 and a central panel 3. An oblong aperture 4 in the can end 1 is shown by dashed lines and can be seen to be spanned by an upper portion 5 of a closure 6. The closure 6 has an arcuate pull ring 7 which encompasses the upper portion 5, however alternative pull tab configurations may be used if desired.

Figure 2:
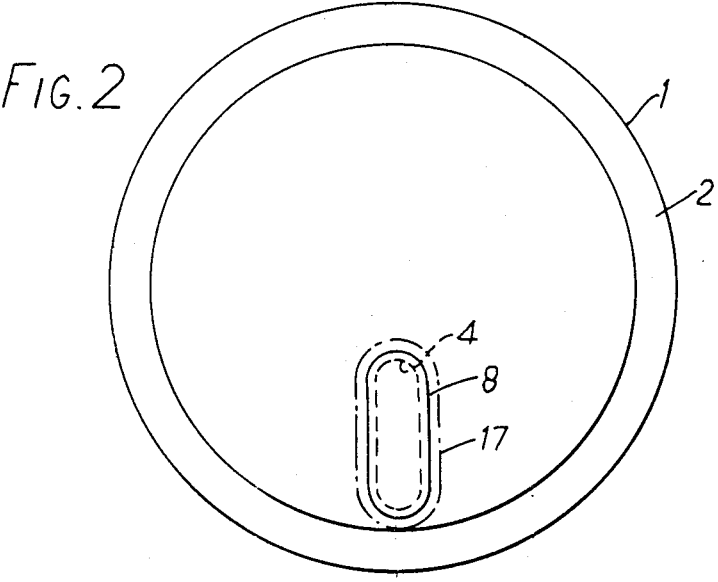
FIG. 2 is a plan view of the underside of the can end of FIG. 1.
Figure 3:
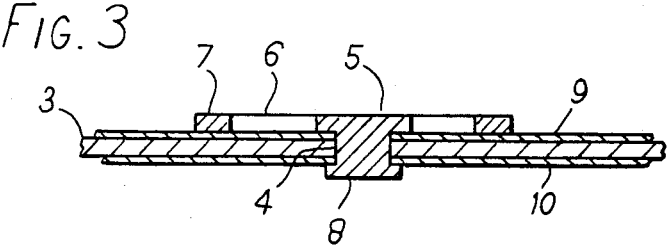
FIG. 3 is a side elevation of the plastics closure sectioned on the line A—A in FIG. 1.

FIGS. 2 and 3 show that the closure 6 extends from the upper portion 5 through the aperture to a lower portion 8 which also spans the aperture 4.

In FIG. 3 the thickness of the central panel 3 is exaggerated to permit showing of a coating 9 of a lubricated varnish to which the plastics closure will not adhere on the outside of the can end 1 and a coating of lacquer 10 on the inside of the can end 1. The lacquer may not always be necessary, depending on the nature of the plastics material chosen for the closure and the metal of the central panel. For example if the plastics material has an ability to adhere by heat sealing to the bare metal of the central panel then no coatings will be necessary.

Figure 4:
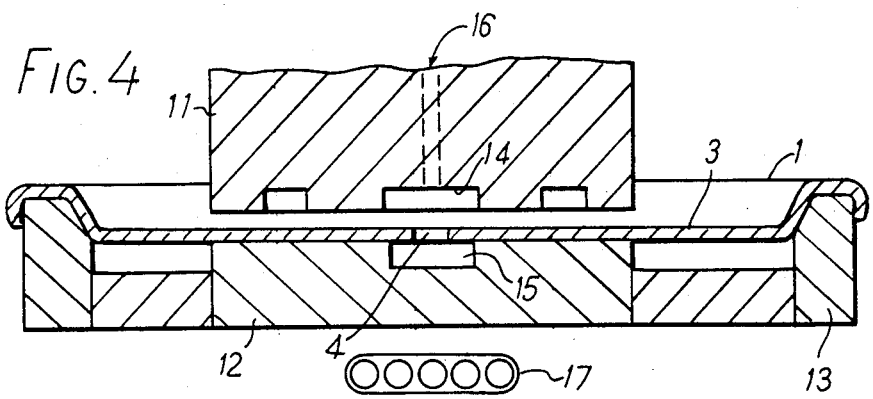
FIG. 4 is a diagrammatic representation of apparatus for making the closure shown in FIGS. 1 to 3.

In FIG. 4 the apparatus for making the closure of FIGS. 1 to 3 comprises an upper die 11, a lower die 12 and locating means 13, (shown in FIG. 4) to hold the can end 1 so that the aperture 4 is located between the dies 11, 12.

The upper die 11 has a cavity 14 therein conforming with the shape of the upper portion 5 and pull ring 7 of closure 6. The lower die 12 has a cavity 15 conforming with the shape of the lower portion 8 of the closure.

Figure 5:
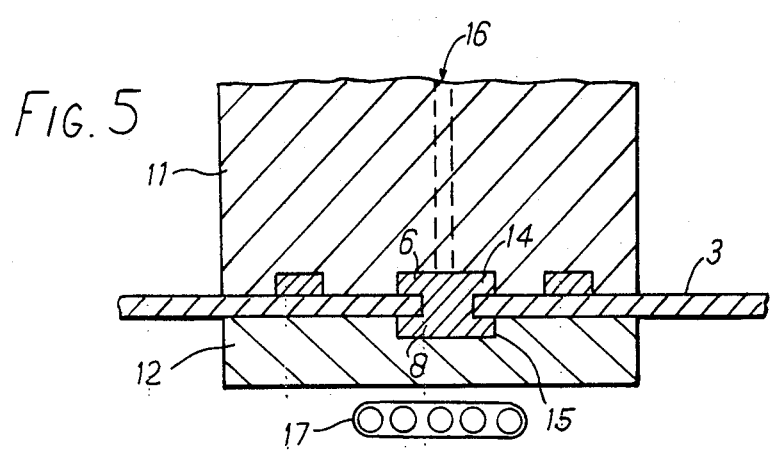
FIG. 5 is a diagrammatic representation of the apparatus in FIG. 4 after moulding.

When the upper die 11 is brought down to clamp the can end 1 against the lower die 12 (as shown in FIG. 5) the upper cavity 14 and lower cavity 15 are connected, by the aperture 4, to form a mould shape so that when a plastics material is passed through entry pipe 16 into the mould shape the closure 6 is moulded into keyed engagement with the aperture.

In order to prevent the plastics material chilling before a plastics-to-metal seal is effected, a pulse of energy is provided from an induction coil 17 to heat at least a margin around the aperture 4 and encourage heat sealing of the lower portion 8 of the closure to the lacquer 10. The approximate plan shape of the induction coil 17 is depicted in FIG. 2 by a line of dots and dashes 17.

The lower die 12 is made of a glass so that the flux energy provided by the induction coil is not wastefully dissipated in heating the lower die. The glass lower die is preferably no thicker than 10 mm.

Although the means to cool the plastics material may simply be a prolonged period of time, this cooling period may, if desired, be reduced by providing at least one of the dies with cooling means in the form of external fins or internal passages for a coolant fluid.

Figure 6:
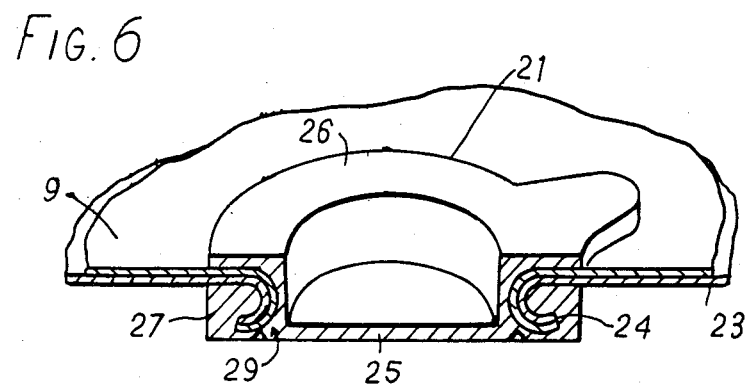
FIG. 6 is a side elevation of an alternative circular closure sectioned on a diameter.

FIG. 6 shows an alternative form of closure 21 made in the manner hereinbefore described. The marginal edge of the aperture is in the form of a curl 24 raised and reformed out of the central panel 23. The closure 21 has upper portion in the form of a plug portion having an annular flange 26, which may if desired be provided with a pull tab or a pull ring of the kind shown in FIG. 1. As in FIGS. 1 to 3 the closure material extends through the aperture to an annular lower portion 27 which in FIG. 6 can be seen to envelope the free edge of the curl so protecting it from the influence of any corrosive product. The lower portion 27 is sealingly adhered to the inside of the curl by induction heating and it will be understood that as the plastics material cools any shrinkage of the periphery of the lower portion will bring a hoop stress to pull the lower portion into increased contact with the inside of the curl; likewise any shrinkage of the upper portion, which is prevented from adhering to the central panel 23 by the coating 9 of lubricating lacquer, will create a closure which is firmly anchored to the inside of the curl but free to be removed from the aperture provided the closure tears between the anchored annular lower portion 27 and the plug portion 25. An annular groove 29 is moulded within the annular lower portion 27 to ensure tearing will occur to permit removal of the replaceable plug portion 25.

Various examples of suitable combinations of metal panel, coatings and plastics materials are now given:

EXAMPLE 1

A tinplate can end was stamped out of a sheet of TFS, as hereinbefore defined, coated on one side with a highly lubricated varnish to which plastics do not stick and coated on the other side with an epoxy phenolic lacquer. An aperture was pierced in the central panel of the can end and the pierced can end was placed in the apparatus of FIG. 4. The dies were closed and nylon 66 was injection moulded into the die cavities to mould the closure of FIGS. 1 to 3. The peripheral margin of the aperture was induction heated for a period of seconds. After a period of cooling the mould was then opened and the can end removed. The nylon closure was found to be firmly sealed to the epoxy phenolic lacquer in the can end.

EXAMPLE 2

A can end was stamped out of a sheet of tinplate one side of which was coated with a highly lubricated varnish to which plastics do not stick. The closure of FIGS. 1 to 3 was moulded from a copolymer of ethylene and partly neutralised acrylic acid such as that sold under the Trademark SURLYN by Dupont Corporation. On removal from the dies the closure was found to be firmly sealed to the bare tinplate.

From the foregoing description it is apparent that fluent plastics materials can be encouraged to adhere to metal substrates by delaying chilling until a bond has developed.

Figure 7:
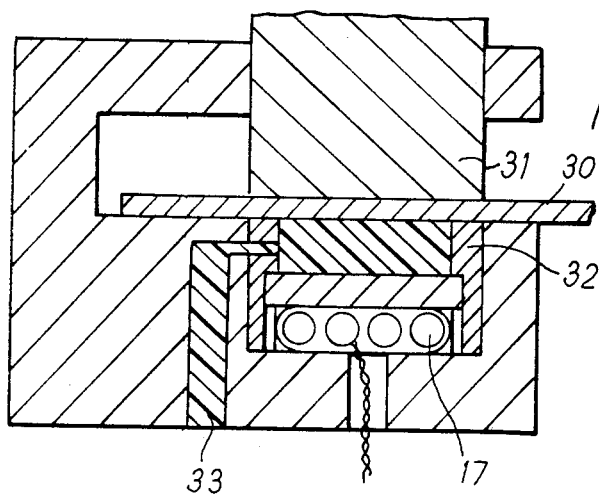
FIG. 7 is a diagrammatic representation of apparatus for casting a pad onto a metal substrate.

In FIG. 7 a simple apparatus is shown in which a metal substrate 30 is clamped between an upper die 31 and a lower die 32. Plastics material 33 has been injected into the lower die 32 and that portion of the metal substrate which the plastics material touches is heated by means of the induction coil 17.

Figure 8:
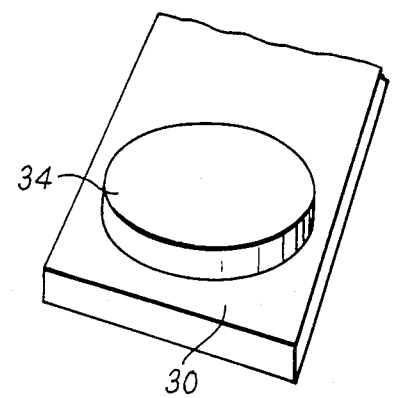
FIG. 8 is a perspective view of the product of the apparatus of FIG. 7.

FIG. 8 shows the article produced which comprises a strip of metal substrate 30 to which is bonded a pad 34 of plastics material. The apparatus of FIG. 7 may be used to provide plastic feet for metal boxes or like cabinets.

Figure 9:
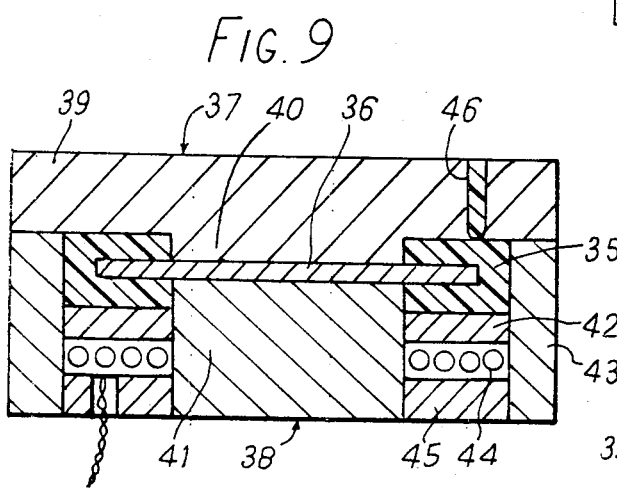
FIG. 9 is a diagrammatic representation of apparatus for casting an annulus of plastics material onto a metal disc.
Figure 10:
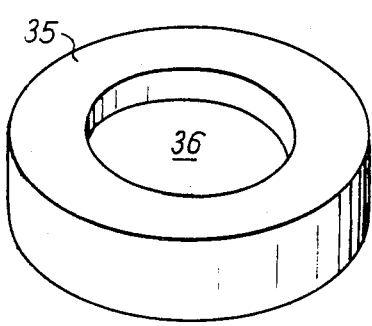
FIG. 10 is a perspective view of the product of the apparatus of FIG. 9.

In FIG. 8 plastic pad 34 is retained in the sheet metal 30 by adhesion alone in contrast to the annulus 35 of plastics material which surrounds a marginal portion of a metal disc, as shown in FIGS. 9 and 10, which provides a structural engagement of the plastics annulus with the disc.

FIG. 9 shows apparatus for moulding the annulus 35 of plastics material onto a peripheral marginal portion of the disc 36. The apparatus comprises an upper tool 37 and a lower tool 38.

The upper tool 37 has a top plate 39 which spans the lower tool and a central plug portion 40 which extends from the top plate 39 to engage with a central portion of disc 36. The peripheral marginal portion of the disc 36 extends laterally of the plug portion 40.

The lower tool comprises a plug 41 of diameter substantially equal to the plug portion 40 of the upper tool, an annular glass plate 42 extending laterally of plug 41, and an outer wall 43 which surrounds the glass plate 42. An induction coil 44 is held under the glass plate 42 by a retaining ring 45 which holds the plug 41 centrally within the outer wall 43.

In FIG. 9 the disc 36 is clamped between the plug portion 40 of the upper tool and the plug 41 of the lower tool. Plastics material has been introduced through the feeder 46 to form the annulus 35 of plastics material and induction heat has been applied to the peripheral marginal portion of the disc 36 to sealingly bond the annulus 35 to the disc 36. After a period of cooling the tools are parted to permit removal of component shown in FIG. 10.

The tooling of FIG. 9 may, if desired, be modified by provision of a frustoconical boss on the plus portion 40 and a complementary recess on the plug 41 so that a disc having a complementary central contour may be automatically centred as the tools close before the annulus is cast onto it.

The tooling of FIG. 9 may be further modified by extending the length of the outer wall 44 of the lower tool and the plug portion 40 of the upper tool so that the annulus has the form of an elongate skirt such as is used for screw caps or closures for bottles.

I claim:

1. A method of forming a closure member in a metal container comprising the steps of providing a metal container end having opposite surfaces and an aperture therethrough of a predetermined size and peripheral outline, providing a mould formed of two dies each having a cavity of a predetermined size and peripheral outline larger than the predetermined size and peripheral outline of the aperture and at least one of the dies having a die portion transparent to electromagnetic energy, clamping the metal container end between the dies with the aperture in general alignment with the die cavities and proximate the die portion thereby exposing to each cavity and the die portion a peripheral edge portion of the metal container end contiguous the aperture, injecting flowable plastics material into the cavities and the aperture therebetween, generating electromagnetic energy exteriorly of the cavity so as to transmit the same through the die portion, and thereby effect localized induction heating of only the aperture peripheral edge portion during the injection step to sealingly adhere the plastics material to the opposite surface at the peripheral edge portion thereby forming a closure member in the container end.

2. The method according to claim 1 wherein a lower one of the two dies includes said die portion of material transparent to electromagnetic energy, and the electromagnetic energy generating/induction heating step is performed by transmitting electromagnetic energy through the lower die portion.

3. The method according to claim 2 wherein at least one of the two dies has a coolant passage therein, and a cooling step is performed by passing a coolant fluid through the coolant passage.

4. The method according to claim 1 wherein at least one of the two dies has a coolant passage therein, and a cooling step is performed by passing a coolant fluid through the coolant passage.

5. The method according to claim 1 including the step of applying a coating material to which the plastics material will adhere to at least one surface of opposite surfaces at the peripheral edge portion prior to the performance of the injecting step.

6. The method according to claim 1 including the step of applying a lubricated varnish to at least a portion of one of the opposite surfaces to which the plastics material will not adhere prior to the performance of the injecting step.

7. The method according to claim 6 including the step of applying a coating material to which the plastics material will adhere to at least one surface of opposite surfaces at the peripheral edge portion prior to the performance of the injecting step.

8. The method according to claim 7 wherein the coating material is applied to the surface defining the inside surface of the container end, and the coating of lubricating varnish is applied to the surface defining the outside surface of the container end.

9. A method of forming a closure member in a metal container end comprising the steps of providing a metal container end having opposite inner and outer surfaces, a central panel, a curl outboard of the central panel, the curl opening in a direction toward and being defined in part by the inner surface, the aperture being of a predetermined size and peripheral outline and being defined by a peripheral edge portion within the central panel, the method comprising the steps of applying coatings to the outer and inner surfaces of the metal container end to which plastics material will respectively generally no adhere and will generally adhere, providing a mould formed of two dies each having a cavity of a predetermined size and peripheral outline larger than the predetermined size and peripheral outline of the container and aperture, clamping the metal container end between the dies with the aperture in general alignment with the die cavities thereby exposing to each cavity the peripheral edge portion of the metal container and contiguous the aperture, injecting flowable plastics material into the cavities and the aperture therebetween, and induction heating at least the aperture peripheral edge portion during the injection step to sealingly adhere the plastics material to the inner surface at the peripheral edge portion thereby forming a closure member in the container end whose surface adjacent the outer surfaces is generally not adhered thereto.

10. A method of injection moulding a plastics material onto a metal substrate comprising the steps of providing first and second dies between which a metal substrate is adapted to be disposed when the dies are closed, at least one of the dies including a cavity of a predetermined peripheral outline exposed to an opening in a direction toward a predetermined surface portion of the metal substrate which is to be coated with plastics material, positioning the metal substrate between the first and second dies when the latter are opened, closing the first and second dies, injecting plastics material into the cavity in conformity therewith and against the predetermined surface portion of the substrate, generating electromagnetic energy exteriorly of the cavity approximate a portion of the die, and transmitting the generated electromagnetic energy through the die portion to thereby effect localized induction heating of the surface portion during the injecting of the plastics material into the cavity while otherwise restricting the transmission of the same generated electromagnetic energy into the cavity through remaining die portions.

11. Apparatus for injection moulding a plastics material onto a metal substrate comprising first and second dies between which a metal substrate is adapted to be disposed when said dies are closed, at least one of said dies including means for defining a cavity of a predetermined peripheral outline exposed to and opening in a direction toward a predetermined surface portion of the metal substrate which is to be coated with plastics material, means for injecting plastics material into said cavity in conformity therewith and against said predetermined surface portion, at least one of said dies being defined in part by a die portion transparent to electromagnetic energy, and means for generating electromagnetic energy exteriorly of said cavity approximate said die portion and transmit the same through said die portion to thereby effect localized induction heating of the predetermined surface portion during the injecting of the plastics material into said cavity.

12. The apparatus according to claim 11 wherein said cavity is of a configuration to accommodate a can end defined by the metal substrate.

13. The apparatus according to claim 11 wherein the predetermined surface portion is unapertured and thereby closes said cavity when the dies are closed thus limiting the injecting of the plastics material to only the closed cavity and the predetermined surface portion of the substrate.

14. The apparatus as defined in claim 13 wherein said die portion is surrounded by a remaining portion of said second-mentioned at least one die, and said remaining die portion is constructed of material which offers greater resistance to the passage therethrough of electromagnetic energy than that of said die portion transparent to electromagnetic energy.

15. The apparatus according to claim 11 wherein said cavity is of an annular configuration and the metal substrate includes a terminal peripheral edge disposed in said annular cavity whereby the plastics material is injected upon the terminal peripheral edge.

16. The apparatus as defined in claim 15 wherein said die portion surrounds a remaining portion of said second-mentioned at least one die, and said remaining die portion is constructed of material which offers greater resistance to the passage therethrough of electromagnetic energy than that of said die portion transparent to the electromagnetic energy.

17. The apparatus according to claim 11 wherein said cavity is of an annular configuration and the metal substrate includes a terminal peripheral edge disposed in said annular cavity whereby the plastics material is injected upon the terminal peripheral edge, and said first and second dies have opposing clamping surface means surrounded by said annular cavity for clamping therebetween the metal substrate when said dies are closed.

18. The apparatus according to claim 11 wherein said cavity is defined by opposing first and second cavity portions in said respective first and second dies and an opening in and through the metal substrate of a size less than the predetermined surface portion and located within said predetermined peripheral outline whereby plastics material injected into said cavity fills the opening and coats opposite surfaces of the substrate within said predetermined peripheral outline.

19. The apparatus as defined in claim 11 wherein said die portion is surrounded by a remaining portion of said second-mentioned at least one die, and said remaining die portion is constructed of material which offers greater resistance to the passage therethrough of electromagnetic energy than that of said die portion transparent to electromagnetic energy.

20. The apparatus as defined in claim 11 wherein said die portion surrounds a remaining portion of said second-mentioned at least one die, and said remaining die portion is constructed of material which offers greater resistance to the passage therethrough of electromagnetic energy than that of said die portion transparent to the electromagnetic energy.

21. The apparatus as defined in claim 20 wherein said die portion surrounds a remaining portion of said second-mentioned at least one die, and said remaining die portion is constructed of material which offers greater resistance to the passage therethrough of electromagnetic energy than that of said die portion transparent to the electromagnetic energy.

22. Apparatus for forming a closure member in a metal container end having opposite surfaces and an aperture therethrough of a predetermined size and peripheral outline bounded by a peripheral edge portion comprising a mould formed of two dies each having a cavity of a predetermined size and peripheral outline larger than the predetermined size and peripheral outline of an associated metal container aperture, at least one of said two dies having a die portion transparent to electromagnetic energy, means for clamping the metal container end between the dies with the aperture in general alignment with the die cavities and proximate the die portion thereby exposing to each cavity and the die portion the peripheral edge portion of the metal container end, means for injecting flowable plastics material into the cavities and the aperture therebetween in overlapping relationship to the opposite surfaces of the peripheral edge portion, and an induction coil means for generating electromagnetic energy exteriorly of the cavity so as to transmit the same through said die portion inducing heat only at the aperture peripheral edge portion during the injection step and while the dies are closed to sealingly adhere the plastics material to the opposite surfaces at the peripheral edge portion.

23. The apparatus as defined in claim 22 wherein a lower of the dies includes said die portion of material transparent to electromagnetic energy, and said electromagnetic energy generating means is induction coil means adjacent the lower die.

24. The apparatus as defined in claim 22 including coolant passage means in at least one of the two dies for permitting the passage of a coolant fluid therethrough.

25. The apparatus as defined in claim 24 including coolant passage means in at least one of the two dies for permitting the passage of a coolant fluid therethrough.

* * * * *